Figure 1:
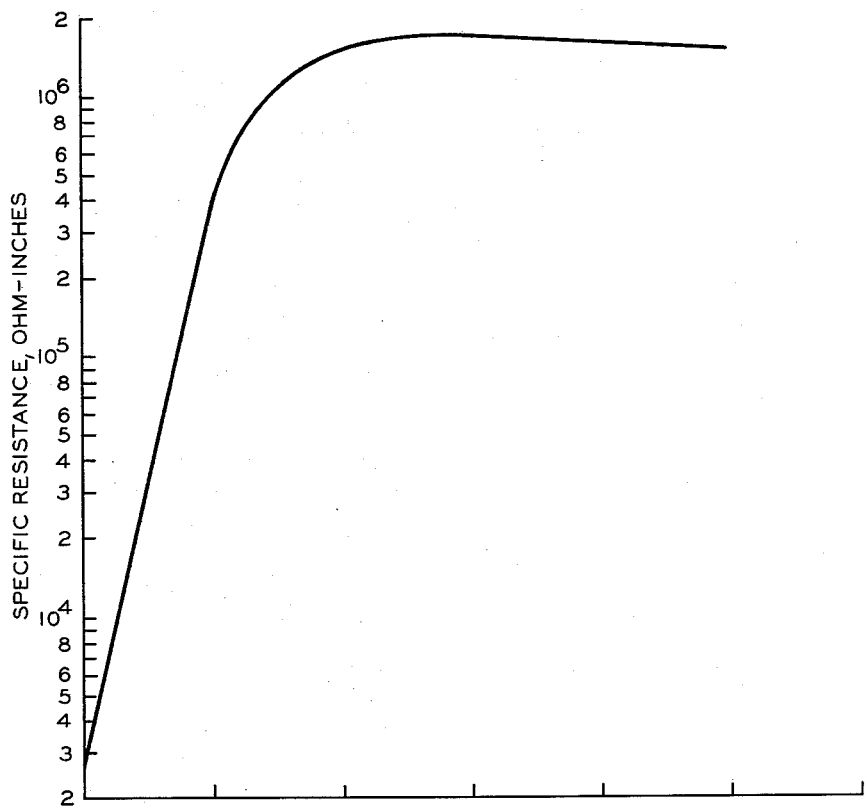
Figure 2:
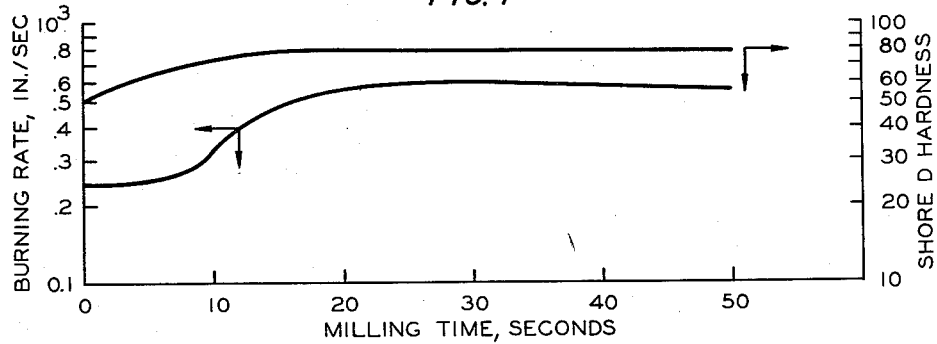

INVENTORS
E. D. GUTH
C. D. LONG
BY Hudson and Young
ATTORNEYS

United States Patent Office 3,044,910
Patented July 17, 1962

3,044,910
HIGH BURNING RATE SOLID PROPELLANT
Eugene D. Guth, Idaho Falls, Idaho, and Claude G. Long, Bartlesville, Okla., assignors to Phillips Petroleum Company, a corporation of Delaware
Filed June 16, 1958, Ser. No. 742,432
13 Claims. (Cl. 149—19)

This invention relates to high burning rate solid propellants and to a method for their production. In one aspect this invention relates to a novel solid propellant composition having a relatively high burning rate. In another aspect this invention relates to a process for producing solid propellant compositions whereby the burning rate of the propellant is increased over that of the prior art solid propellants.

Solid propellant compositions are known which comprise 50 to 90 parts by weight of solid inorganic oxidizing salt; a small amount of burning rate catalyst; and from 10 to 50 parts by weight of a copolymer of a conjugated diene having 4 to 6 carbon atoms and a heterocyclic nitrogen base together with a reinforcing agent and plasticizer. Such solid propellant compositions are described and claimed in copending application Serial No. 574,041, filed March 26, 1956, by B. W. Williams et al., now Patent No. 2,996,370, issued August 15, 1961.

The rubbery polymers employed as binders in the solid propellant compositions of the referred to copending application are copolymers of conjugated dienes with polymerizable heterocyclic nitrogen bases of the pyridine and quinoline series. These copolymers are prepared by polymerization methods known in the art.

The conjugated dienes employed are those containing from 4 to 6 carbon atoms per molecule and include 1,3-butadiene, isoprene, and the like. Various alkoxy derivatives, such as methoxy and ethoxy, and cyano derivatives of those conjugated dienes are also applicable. Thus, other dienes, such as phenylbutadiene and 2-cyano-1,3-butadiene, are also applicable in the preparation of the polymeric binders of this invention.

Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and which contain one, and only one,

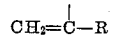

substituent wherein R is either hydrogen or a methyl group. That is, the substituent is either a vinyl or an alpha-methyl vinyl (isopropenyl) group. Of these, the compounds of the pyridine series are of the greatest interest commercially at present. Various substituted derivatives are also applicable but the total number of carbon atoms in the groups attached to the carbon atoms of the heterocyclic nucleus should not be greater than about 15 because the polymerization rate decreases somewhat with increasing size of the alkyl group. Compounds wherein the alkyl substituents are methyl and/or ethyl are available commercially. These heterocyclic nitrogen bases are described more completely in the above referred to application.

In addition to the rubbery polymers disclosed in the copending application, other synthetic rubber compositions, including polychloroprene, poly-1-phenyl-1,3-butadiene, and butyl rubber, are applicable in the present invention. Natural rubber can also be used.

Solid, inorganic oxidizing salts which are applicable in the solid rocket fuel compositions of this invention include ammonium and alkali metal salts of nitric and perchloric acids and mixtures thereof. Ammonium nitrate and ammonium perchlorate are the preferred oxidizers for use in the propellant compositions of this invention. Other specific oxidizers include sodium nitrate, potassium perchlorate, lithium chlorate, and the like. Mixtures of oxidizers are also applicable. In the preparation of the solid propellant composition, the oxidizers are powdered to sizes, preferably 10 to 300 microns average particle size. The amount of solid oxidizer employed is usually a major amount of the total composition and is generally in the range between 50 and 90 weight percent of the total mixture of oxidizer and binder. If desired, however, less than 50 percent by weight of the oxidizer can be used.

Combustion rate catalysts applicable in the invention include ammonium dichromate, metal ferrocyanides, metal ferricyanides, copper chromite and iron oxide. The complex metal cyanides are preferred. Ferric ferrocyanides such as Prussian, Berlin, Hamburg, Chinese, Paris, and milori blue, soluble ferric ferocyanides, such as soluble Berlin or Prussian blue which contain potassium ferric ferrocyanide, and ferric ferrocyanide which has been treated with ammonia, are among the materials which can be used. Ferrous ferricyanide, Turnbull's blue, is also applicable. A particularly effective burning rate catalyst is milori blue which is a pigment similar to Prussian blue and is prepared by the oxidation of a paste of potassium ferrocyanide and ferrous sulfate. Other metal compounds such as nickel or copper ferocyanides can also be employed. The amount of combustion rate catalyst will usually be 0.25 to 12 parts by weight per 100 parts of oxidizer and binder. The catalyst can be omitted entirely if desired.

Finely divided carbon black is used as filler or reinforcing agent. The carbon black is usually used in an amount in the range of about 20 to about 150 parts by weight per 100 parts by weight of copolymer.

In general, any rubber plasticizers can be employed in these binder compositions. Materials such as "Pentaryl A" (amylbiphenyl), "Paraflux" (saturated polymerized hydrocarbon), "Circlsol-2-XH" (petroleum hydrocarbon softener having a specific gravity of about 0.94 and a Saybolt Universal viscosity of 100° F. of about 2000 seconds), dibutoxyethoxyethyl formal, and dioctathiolate are suitable plasticizers. Materials which provide rubber having good low temperature properties are preferred. It is also frequently preferred that the plasticizers be oxygen-containing materials. The amount of plasticizer used will be only that required to render the copolymer manageable during incorporation of the oxidizer and forming the product. Ordinarily, 15 to 30 parts by weight per 100 parts by weight of copolymer of a plasticizer will be used although more or less can be used and the plasticizer can be omitted entirely if its presence is not required to incorporate the ingredients. Liquid polybutadiene and aromatic hydrocarbon oil resulting from the distillation of petroleum fractions are particularly preferred plasticizers because they are particularly effective in rendering the components of the composition manageable and are entirely consumed as fuel. An aromatic residual oil having an API gravity at 60° F. of about 10 to about 13.5 has been found particularly effective.

Broadly, the invention contemplates producing solid propellant compositions having a relatively high burning rate which comprises performing work upon a propellant composition comprising a solid inorganic oxidizing salt and a rubber binder, preferably by milling the composition between closely spaced surfaces having differential motion, until the Shore D hardness is increased at least to about 90 percent of the value ultimately attainable by such working and the electrical resistivity has increased at least to about 40 percent of the ultimate value. It is necessary to use a composition which will harden during milling or which has been previously processed to produce a hard propellant which is then milled or worked in accordance with this invention.

The binder composition can be varied in many ways and still obtain the hardening during milling. For example, the carbon black can be held at a high level, and the hardening is further enhanced by using a fine particle size black, for example, with an average particle diameter as low as 5 to 10 millimicrons. Hardening can also be enhanced by leaving out the plasticizer or a portion of the plasticizer during milling. Another method of inducing the hardening is to mill the propellant with a large amount of oxidizer added initially, rather than in incremental portions as is usually practiced; additional binder can then be added subsequently to adjust the composition after the hardening and the high burning rate properties have been achieved. Still another approach effective to produce hardening during milling is by the inclusion of additives such as cobalt, nickel, and copper salts, for example, the chlorides.

In another approach to obtain this improved burning rate, a propellant comprising a rubbery binder solid inorganic oxidizing salt can be cured to produce the hardening and the cured propellant then milled in accordance with this invention to obtain improved burning rate characteristics. Also, the rubbery binder can be cured to a relatively hard stage and then milled with the inorganic oxidizing salt and other propellant ingredients, if any, to produce the final product having a high burning rate.

It is an object of this invention to provide a process for increasing the burning rate of a solid propellant composition.

It is also an object of this invention to provide a solid propellant composition having a higher burning rate than the prior art propellant compositions.

It is a further object of this invention to provide a method for hardening the rubber binder in the propellant composition comprising a rubber binder and a solid inorganic oxidizing salt.

Other objects and advantages will be apparent to one skilled in the art upon studying the accompanying disclosure, including the detailed description of the invention.

Just what the mechanism is by which burning rate is increased, as a result of the work performed upon the propellant composition, is not definitely known. The necessity for milling the propellant composition in the hardened condition may be postulated to be due to the ability of the oxidizer crystals to reorient themselves rapidly in soft binder so as to pass between the milled surfaces with a minimum of crushing effected by bridging of the granules between the mill rolls. In hardened binder, the solid oxidizer granules which tend to bridge between the differentially moving rolls are unable to reorient themselves to avoid the crushing action of the rolls, and thus the granules are rapidly crushed to a very small size. Although this is only a hypothesis, it appears plausible in that the fast burning hard propellants prepared by the method of this invention have been found, by microscopic inspection, to have the oxidizer in such fine subdivision that the propellant appears to be a single phase. It has been determined, however, that the high burning rates are not obtained by merely dispersing finely ground oxidizer and other ingredients in the binder. Also, the high burning rates are not produced by mixing in a mill having large clearances or in an internal blade mixer.

Numerous types of mills can be used in carrying out the process of this invention, the principal requirement being that at least part of the mixing is effected between two surfaces having small clearance, e.g., 0.009 inch. Examples of such apparatus are roll mills, pigment mills, and edge-runner mills. These mills are adapted to exert a large amount of work on the material being mixed and thus enduce hardening of the rubbery binder.

The hardened propellant of this invention is not extrudably by present methods but can be formed into desired shapes as pressed charges.

The nonextrudability of the high burning rate propellants of the present invention can be obviated by mixing with additional soft binder or with a portion of a relatively soft propellant. The final composition can be varied as desired, for example, by: (1) using hard propellant of the present invention and soft propellant in the desired proportions, or (2) using a hard propellant of the present invention low in rubbery binder and mixing with additional soft rubber binder and/or soft propellant relatively high in binder, or (3) adding sufficient plasticizer to the hard propellant to render the propellant extrudable.

EXAMPLE I

A propellant composition was made in a Baker-Perkin mixer using the solvent mix technique of dissolving the copolymer in methylcyclohexane and placing this solution with the rest of the ingredients in the mixer and then removing the solvent during mixing by evacuation. This propellant composition was:

|  | PHR | PHP | Wt. (gm.) |
|---|---|---|---|
| Copolymer [1] | 100 | | 200 |
| Carbolac No. 1 [2] | 140 | 12 | 280 |
| Ammonium nitrate (40μ) | | 88 | 3,520 |
| Copper chromite | | 6 | 240 |
| Ammonium dichromate | | 6 | 240 |

[1] A 90/100 butadiene-methyl vinylpyridine copolymer.
[2] A fine carbon black with an avergae patricle size of 7-9 millimicrons and hereinafter referred to as Carbolac.

Samples of the propellant were milled on a roll mill at 0.009 inch milling gap for varying lengths of time. The milling times of the samples and the measured properties of the milled samples are shown in Table I, and these values of properties are plotted against milling time in the drawing.

Table I
MILLING TIME AND MEASURED PROPERTIES

| Milling Time, Seconds | Designation | Specific Resistance, Ohm-Inches | Hardness, Shore D | Burning Rate, Inches/second at 1,000 p.s.i. |
|---|---|---|---|---|
| 0 | A | 2,770 | 50 | 0.234 |
| 5 | B | 26,600 | 64 | 0.244 |
| 10 | C | 395,000 | 70 | 0.325 |
| 15 | D | 1,020,000 | 80 | 0.496 |
| 20 | E | 1,760,000 | 79 | 0.541 |
| 30 | F | 1,650,000 | 79 | 0.608 |
| 40 | G | 1,670,000 | 76 | 0.597 |
| 50 | H | 1,440,000 | 78 | 0.542 |

It is quite readily seen from the drawing that burning rate, hardness and specific resistance all reach maximum values as milling time increases, and appear to decrease slowly after reaching this maximum. It is also apparent that the burning rate passes through an inflection point while the other two properties do not. Thus, the specific resistivity has increased by a factor of 10 and the hardness has passed through about half of its total change before the burning rate changes to any great extent. Therefore, it is evident that appreciably increased burning rate is not obtained until a considerable amount of work has been expended on the propellant, and other properties, such as hardness, have been affected quite measurably.

EXAMPLE II

In this example, a binder with a composition of 100 parts by weight copolymer, 22 parts furnace carbon black, 3 parts N,N-diphenyl-p-phenylenediamine (antioxidant), 20 parts dibutoxyethoxyethyl formal (plasticizer), and 5 parts magnesium oxide was used. The propellant composition was made with 16.5 parts by weight of this binder, 83.5 parts of ammonium nitrate, 4.0 parts ammonium dichromate and 2.0 parts milori blue.

To show the beneficial effect of milling on a roll mill after curing to obtain the hardened propellant, two propellants were made with the following sequences of steps:

I
(1) Mixed on a roll mill
(2) Extruded to make strands
(3) Cured 24 hours at 180° F.

J
(1) Mixed on a roll mill
(2) Extruded to make strands
(3) Cured 24 hours at 180° F.
(4) Mixed again on roll mill
(5) Compression molded
(6) Sawed up for burning rate samples The mill rolls were set in each instance at 0.011 inch. Burning rate tests were then made on the two samples, the results obtained being shown in Table II.

*Table II*

BURNING RATE RESULTS

| Propellant | Burning Rate at 600 p.s.i. in./sec. | Burning Rate at 1,000 p.s.i. in./sec. | Pressure Exponent |
|---|---|---|---|
| I | 0.222 | 0.277 | 0.43 |
| J | 0.292 | 0.357 | 0.38 |

It is evident that from the above data that milling the propellant after it had been hardened by curing was effective in increasing the burning rate.

EXAMPLE III

This run demonstrates that hardening of the propellant during mixing is at least partly a function of the composition.

Plasticizer is added to rubber to soften and extend the rubber. Mixing a propellant with a soft, plasticized rubber does not require much work. In fact, it is difficult to exert much work on the propellant and the mass does not become hard in the mixing operation. Withholding the plasticizer allows the hardening to take place and enables the mixing to be effected with a considerable amount of work being done on the mixture.

In this run, the order of mixing was varied to effect mixing with a soft binder and with a hard binder. The binder composition was 100 parts by weight copolymer, 22 parts furnace carbon black and 5 parts magnesium oxide. The antioxidant and plasticizer of Example II were incorporated respectively in the amounts of 3 parts and 20 parts for each 100 parts of rubber. The propellant composition in each test consisted of 83.5 parts by weight ammonium nitrate, 16.5 parts of binder (including antioxidant and plasticizer in this figure), 4.0 parts ammonium dichromate and 2.0 parts milori blue.

In a control run I, the copolymer, carbon black, antioxidant and magnesium oxide were preblended and the plasticizer was added to this blend. The complete propellant composition was then mixed on a roll mill with rolls set at 0.011 inch clearance. The composition was easy to mix and did not harden during the mixing operation.

In a run according to the present invention, the copolymer was mixed on the roll mill with the ammonium nitrate, carbon black, antioxidant and catalysts. The mixing process was carried out sufficiently long to effect hardening, and the plasticizer then added with further mixing. This propellant is identified as K. In this test, the plasticizer was added to keep the chemical compositions of the two propellants identical.

The soft propellant was formed by extrusion to produce test specimens, and the hardened propellant was molded by compression. Each test specimen was cured at 180° F. for 24 hours.

The results of burning rate are shown in the table.

*Table III*

TEST DATA

| Propellant | Burning Rate, in./sec., 600 p.s.i. | Burning Rate, in./sec., 1,000 p.s.i. |
|---|---|---|
| I | 0.222 | 0.277 |
| K | 0.290 | 0.390 |

These data show the increased burning rate obtained by the process of this invention.

EXAMPLE IV

This run illustrates making an extrudable propellant by mixing a high burning rate, hard propellant with soft binder.

A hard, high burning rate propellant was produced on a roll mill in accordance with this invention. The composition was 85 parts by weight ammonium nitrate, 2.5 parts copolymer, 3.5 parts Carbolac, 3.0 parts milori blue and 6.0 parts ammonium dichromate. This hard propellant in an amount of 91 parts by weight was mixed on a roll mill with 9 parts of additional binder (7 parts copolymer and 2 parts liquid polybutadiene to form a propellant composition. The unextrudable hard propellant was modified to become extrudable. The burning rate of the final propellant was 0.350 inch a second at 600 p.s.i. and 0.443 inch a second at 1,000 p.s.i.

The designation of this propellant is L.

EXAMPLE V

The extrudable, high burning rate, hard milled propellant of this invention can be mixed with a portion of extrudable propellant to form an extrudable propellant of high burning rate.

In this test a portion of high burning rate, unextrudable, hard milled propellant, designated as X, was mixed by milling with a soft, extrudable propellant, designated as Y, to produce a propellant which has the advantages of both extrudability and relatively high burning rates. Propellant X was 88 parts by weight ammonium nitrate, 5 parts copolymer, 7 parts Carbolac, 6 parts copper chromate and 6 parts ammonium dichromate. Propellant Y was 85 parts by weight ammonium nitrate, 11 parts copolymer, 4 parts liquid polybutadiene, 2 parts milori blue and 4 parts ammonium dichromate. Propellant X had a burning rate of 0.708 inch a second at 600 p.s.i. and 0.97 inch a second at 1,000 p.s.i. Propellant Y had a burning rate of 0.20 inch a second at 600 p.s.i. and 0.28 inch a second at 1,000 p.s.i. Propellant X and propellant Y were mixed together on a roll mill in a proportion of 112 parts to 106 parts respectively. The finished propellant was extrudable and had a burning rate of 0.478 inch a second at 600 p.s.i. and 0.630 inch a second at 1,000 p.s.i. A burning rate at 1,000 p.s.i., assuming alternate layers of the propellants in the proportions tested, was calculated to be 0.441 inch a second. Thus, it is evident that extrudability is obtained with an increase in burning rate over that expected by additive effect.

A propellant was prepared for another run by mixing 30 parts by weight of propellant X with 70 parts of a soft, extrudable propellant, here designated as propellant Z, having a composition of 9.98 parts by weight copolymer, 2.22 parts carbon black, 0.3 part antioxidant, 2.0 parts plasticizer, 0.5 part magnesium oxide, 85 parts ammonium nitrate and 2.0 parts milori blue. Propellant Z had a burning rate of 0.180 inch a second at 600 p.s.i.

and 0.220 inch a second at 1,000 p.s.i. The mixed propellant was extrudable and had burning rates of 0.332 inch a second at 600 p.s.i. and 0.438 inch a second at 1,000 p.s.i. A rate calculated for 1,000 p.s.i., assuming alternate layers burning, is 0.286 inch a second. Again, extrudability is obtained with unexpectedly high burning rate retention.

Variations and modifications are possible within the scope of the disclosure without departing from the spirit and scope of the invention.

That which is claimed is:

1. A process for increasing the burning rate of a solid rocket propellant composition comprising a solid inorganic oxidizing salt, a rubber binder, a plasticizer, and about 20 to about 150 parts by weight per 100 parts of rubber of carbon black, which comprises milling the composition between closely spaced surfaces wherein at least part of the milling is effected between two surfaces having a clearance of about 0.009 inch until the Shore D hardness is greater than about 50 and has increased to at least 90 percent of the maximum value obtainable by milling and the value of electrical resistivity has increased to at least 40 percent of the maximum value obtainable by milling.

2. The process of claim 1 wherein the value of hardness is measured to determine the burning rate desired.

3. The process of claim 1 wherein the value of electrical resistivity is measured to determine the burning rate desired.

4. In the process of producing a solid propellant composition comprising 50 to 90 parts by weight of solid inorganic oxidizing salt; from about 10 to 50 parts by weight of a rubber binder comprising a copolymer of a conjugated diene having 4 to 6 carbon atoms per molecule and at least one

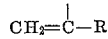

substituted heterocyclic nitrogen base selected from the group consisting of pyridine, quinoline, an alkyl substituted pyridine and an alkyl substituted quinoline, wherein the total number of carbon atoms in the nuclear alkyl substituents is not more than 15 and wherein R is selected from the group consisting of hydrogen and a methyl radical, from 0 to about 12 parts by weight per 100 parts of oxidizer and binder of a burning rate catalyst selected from the group consisting of ammonium dichromate, iron oxide, complex cyanides of iron, complex cyanides of nickel, and complex cyanides of copper; about 20 to about 150 parts by weight per 100 parts by weight of copolymer of a reinforcing agent; and from 0 to about 30 parts by weight per 100 parts by weight of copolymer of a rubber plasticizer, wherein the ingredients are intimately mixed, formed into grains and cured, the improvement which comprises milling said composition between two surfaces having a clearance of about 0.009 inch until the value of hardness has increased at least 90 percent of the maximum value obtainable by milling and the value of electrical resistivity has increased at least 40 percent of the maximum value obtainable by milling.

5. A solid rocket propellant composition, comprising about 50 to about 90 parts by weight of a solid inorganic oxidizing salt; about 10 to 50 parts by weight of rubber selected from the group consisting of natural rubber and synthetic rubber; 0 to about 12 parts by weight per 100 parts of oxidizing salt and rubber of a burning rate catalyst from the group consisting of ammonium dichromate, iron oxide, a complex cyanide of iron, a complex cyanide of nickel, and a complex cyanide of copper; about 20 to about 150 parts by weight per 100 parts of copolymer per 100 parts by weight per 100 parts of carbon black; and 0 to about 30 parts by weight per 100 parts of rubber of a rubber plasticizer, wherein said composition has been milled between two closely spaced surfaces and at least part of the milling has been effected between two surfaces having a clearance of about 0.009 inch until the composition has a Shore D hardness value greater than about 50 and has increased at least 90 percent of the maximum value obtained by milling.

6. The composition of claim 5 wherein the rubber is natural rubber.

7. The composition of claim 5 wherein the rubber is a copolymer of a conjugated diene having 4 to 6 carbon atoms per molecule and at least one

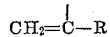

substituted heterocyclic nitrogen base selected from the group consisting of pyridine, quinoline, an alkyl substituted pyridine and an alkyl substituted quinoline, wherein the total number of carbon atoms in the nuclear alkyl substituents is not more than 15 and wherein R is selected from the group consisting of hydrogen and a methyl radical.

8. The composition of claim 5 wherein the Shore D hardness is between 70 and 80.

9. A process for increasing the burning rate of a solid rocket propellant composition comprising a solid inorganic oxidizing salt, a rubber binder, a plasticizer, and about 20 to about 150 parts by weight of carbon black per 100 parts of rubber, which comprises withholding about half of the rubber binder and milling the remaining composition between closely spaced surfaces until hardening of the composition has been initiated; adding the remaining rubber binder; and continuing the milling until the Shore D hardness is greater than about 50 and has increased to at least 90 percent of the maximum value obtainable by milling and the value of electrical resistivity has increased to at least 40 percent of the maximum value obtainable by milling.

10. A process for increasing the burning rate of a solid rocket propellant composition comprising a solid inorganic oxidizing salt, a rubber binder, a plasticizer, and about 20 to about 150 parts by weight of carbon black per 100 parts of rubber, which comprises withholding the plasticizer from the composition and milling the remaining composition between closely spaced surfaces until hardening of the composition has been initiated; adding the plasticizer; and continuing the milling operation until the Shore D hardness is greater than about 50 and has increased to at least 90 percent of the maximum value obtainable by milling and the value of electrical resistivity has increased to at least 40 percent of the maximum value obtainable by milling.

11. A process for increasing the burning rate of a solid rocket propellant composition comprising a solid inorganic oxidizing salt, a rubber binder, a plasticizer, and about 100 to about 150 parts by weight of carbon black per 100 parts of rubber which comprises milling the composition between closely spaced surfaces until the Shore D hardness is greater than about 50 and has increased to at least 90 percent of the maximum value obtainable by milling and the value of electrical resistivity has increased to at least 40 percent of the maximum value obtainable by milling.

12. A process for increasing the burning rate of a solid rocket propellant composition comprising a solid inorganic oxidizing salt, a rubber binder, a plasticizer, about 20 to about 150 parts by weight of carbon black per 100 parts of rubber, and a metal selected from the group consisting of cobalt, nickel, and copper, which comprises milling the composition between closely spaced surfaces until the Shore D hardness is greater than about 50 and has increased to at least 90 percent of the maximum value obtainable by milling and the value of electrical resistivity has increased to at least 40 percent of the maximum value obtainable by milling.

13. A process for increasing the burning rate of a solid rocket propellant composition comprising a solid inorganic oxidizing salt, a rubber binder, a plasticizer and about 20 to about 150 parts by weight of carbon black per 100 parts of rubber, wherein the rubber binder has been cured, which comprises milling the composition between closely spaced surfaces until the Shore D hardness is greater than about 50 and has increased to at least 90 percent of the maximum value obtainable by milling and the value of electrical resistivity has increased to at least 40 percent of the maximum value obtainable by milling.

References Cited in the file of this patent

UNITED STATES PATENTS 2,877,504   Fox ------------------ Mar. 17, 1959

FOREIGN PATENTS 655,585   Great Britain ---------- July 25, 1951

OTHER REFERENCES

Jet Propulsion, Air Technical Service Command, 1946, page 158.

Chem. and Eng. News, Oct. 7, 1957, pp. 62–3.

Dougherty: "Chem. Eng. Progress," vol. 53, No. 10, October 1957, pp. 489–92.

Chilton: Chem. and Eng. News, vol. 65, No. 8, April 21, 1958, pp. 126–9.